UNITED STATES PATENT OFFICE.

JOHN T. DAVIS, OF SAN FRANCISCO, CALIFORNIA, ASSIGNOR OF ONE-HALF TO CHARLES W. KOHLSAAT, OF NEW YORK, N. Y.

ARTIFICIAL FUEL.

SPECIFICATION forming part of Letters Patent No. 619,728, dated February 21, 1899.

Application filed February 10, 1898. Serial No. 669,797. (No specimens.)

*To all whom it may concern:*

Be it known that I, JOHN T. DAVIS, a citizen of the United States, residing at San Francisco, in the county of San Francisco and State of California, have invented certain new and useful Improvements in Artificial Fuel; and I do hereby declare the following to be a full, clear, and exact description of the invention, such as will enable others skilled in the art to which it appertains to make and use the same.

This invention relates to fuel, &c.

The object is in a ready, practical, and comparatively inexpensive manner to form finely-divided coal—such as culm, screenings or slack, or any other suitable substance, such as ores or metal-containing substances in fine division—with a bond into blocks or briquets which shall be strongly coherent, without liability to break in transportation or handling or fall asunder prematurely in burning or subjection to fire and which shall be of a construction to facilitate drying and combustion or burning or roasting, and the bond of which, while being highly tenacious, shall at the same time present matter in itself highly combustible and affording some oxygen gradually in the burning to the complete combustion of the coal or other desirable effect on subjection of the mass, blocks, or briquets to the action of fire.

With this object in view the invention consists generally in a suitable substance to be agglomerated into mass, blocks, briquets, or the like having a binder or bond composed of gelatinous matter and tannic acid or tan; furthermore, in a suitable substance to be agglomerated into mass, blocks, briquets, or the like having a binder or bond composed of finely-divided animal matter containing gelatin or gelatinous scrap or of finely-divided gelatinous offal or of other finely-divided gelatinous matter and tannic acid or tan, and, finally, in a suitable substance to be agglomerated into mass, blocks, briquets, or the like having a binder or bond composed of finely-divided gelatinous matter the striæ of which will aid in effecting the bond, and tannic acid or tan and ligneous matter, such as spent or unspent tanbark or other woody matter containing tannin, the fibers of which will further aid in effecting the bond and will present additional combustive material.

The invention also consists in the process of effecting the agglomeration.

It is well known that tannic acid or tan, natural or artificial, such as the product made by digesting powdered charcoal in nitric acid and filtering the product, has the effect of rendering gelatin insoluble in water; that the union of tannic acid or tan with gelatin-tannate of gelatin, or the union of tannic acid or tan with matter containing gelatin, forming a leather or substance in the nature of leather, presents matter which is combustible.

Under gelatins are included the collagenes and chondrin, or true gelatin, as well as glutin, and if with gelatinous matter there should be any bases of the fatty acids and pyridine series by distillation within blocks or briquets made upon their being heated internally in burning from their exterior inward this would be no detriment to a fuel. Chondrin as well as glutin is precipitated from its aqueous solution by tannic acid, and substances yielding gelatin in any form combine with tannic acid, withdrawing the latter completely from its solution, forming leather, so that in the employment of tannic acid or tan with gelatin to form a bond for a fuel it is not necessary to use the gelatin free from its containing tissues; but it is actually advantageous to employ the tissues also, as the striæ thereof aid in the bond.

In carrying my invention into effect I may mix the substance to be agglomerated with gelatin generally and with tannic acid or tan, or with true gelatin and tannic acid or tan, or with any gelatinous matter and tannic acid or tan, or I may mix with the substance gelatin or gelatinous matter and any suitable matter containing tannic acid or the elements of tan, or with tannic acid or tan and any ligneous matter, as aforesaid.

Specifically to carry my invention into effect for each one hundred pounds of substance to be agglomerated and taken, preferably, in a state of fine division, such as coal-slack, screenings, or culm, I dissolve (according to the less or greater refractory disposition toward agglomeration of the substance to be agglomerated, thus in the case of coal, bituminous coal, such as coking coal, requiring the least and lignite the most) from one to four or five per cent. of gelatin in twice its weight of water, or I soak about six per cent. of gelatinous matter, such as finely-divided hide clippings, finely-divided offal, or finely-divided gelatinous scrap or other gelatinous matter, in water until the gelatin shall have been substantially dissolved. I also dissolve in another vessel, according to the quantity of gelatin requisite, from one-half of one per cent. to one per cent. of tannic acid or tan in water in the proportion of one pound of tannic acid or tan to three gallons of water in the case of gelatinous scrap, one per cent. of tannic acid or tan being employed; or I soak ligneous matter containing tannic acid, such as unspent tanbark and taken in quantity according to the amount of tannic acid in it, in sufficient water to make a wet and easily-distributable mass, the quantity of water being varied according to the moisture in the substance to be agglomerated, as the quantity and strength of the solution must correspond to the quantity of gelatin present in such substance, and the ligneous matter acting as so much carboniferous matter to aid in the elimination or presentation of heat units. I then thoroughly incorporate the gelatin or gelatinous mass with the substance to be agglomerated, and then mix with it the tannic acid or tan solution and press the mass into blocks or briquets. The procedure which has so far given the best results is the boiling of the gelatinous animal matter or scrap with about its own weight of water by the aid of a steam-coil and until the tissues of the animal matter have been converted into a gluey substance, the necessary quantity of this gluey substance, representing the requisite per cent. of pure gelatin required, being, while still hot, added to the substance to be agglomerated, after which tannic acid or tan dissolved in water is added, and the whole mass is then thoroughly mixed while kept at a temperature of from 150° to 200° Fahrenheit, the object of the heating and mixing being to bring about the union of the tannic acid with the gelatin to produce a tannate of gelatin compound in a subdivided state, whereby in the entire mixture each particle of the substance to be agglomerated will be incased in an envelop of the tanno-gelatin compound, making a completely and firmly bonded mass, then to be pressed into briquets or blocks of any desired size.

In forming the mass into blocks I have found it advantageous to form each block or briquet with a hole through it, whereby the briquets will sooner dry out and become marketable and on ignition more of the block or briquet will be at the same time subjected to burning or other action of fire and the draft will also be facilitated.

In some cases, particularly where the tannic acid is presented with matter (such as woody matter) containing it, I may elect to mix this with the substance to be agglomerated by incorporating the gelatin or gelatinous matter with the substance, or I may mix finely-divided woody matter, such as spent tanbark, with the substance in about the proportion of about one hundred pounds to the ton and employ then enough tannic acid to compensate for the want of tannic acid in this woody matter. As the per cent. of tannic acid present in the spent bark varies from one to five per cent., the equivalent of tannic acid necessary to bring about the transformation of the gelatinous substances should be brought up to an aggregate of one per cent.

Having thus described my invention, what I claim, and desire to secure by Letters Patent of the United States, is—

1. A mass, block, or briquet of coal or other mineral substance, having tannate of gelatin as a binder or bond, substantially as described.

2. The process of agglomerating coal or other mineral substance, which consists in putting gelatinous matter in water, dissolving a tanning agent in water, then mixing the gelatinous liquid with the substance to be agglomerated, then adding to and mixing with the whole, the solution of the tanning agent and, finally, dividing the whole matter into briquets or blocks of any suitable size, substantially as described.

3. The process of agglomerating coal or other mineral substance, which consists in boiling gelatinous matter in water, then dissolving a tanning agent in water, then mixing the gelatinous matter, while still hot, with the substance to be agglomerated, then adding the solution of the tanning agent, and then thoroughly mixing the whole matter, while keeping it at a temperature of from 150° to 200° Fahrenheit, and then dividing it into briquets or blocks of any size, substantially as described.

In testimony whereof I affix my signature in presence of two witnesses.

JOHN T. DAVIS.

Witnesses:
LEE D. CRAIG,
J. W. NYE.